US006927879B2

(12) United States Patent
Takahashi

(10) Patent No.: US 6,927,879 B2
(45) Date of Patent: Aug. 9, 2005

(54) POWER SUPPLY CABLE HAVING A SIMPLE STRUCTURE AND AN IMAGE READING APPARATUS USING SUCH A POWER SUPPLY CABLE

(75) Inventor: Takuji Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 603 days.

(21) Appl. No.: 09/864,252

(22) Filed: May 25, 2001

(65) Prior Publication Data
US 2002/0050396 A1 May 2, 2002

(30) Foreign Application Priority Data
May 29, 2000 (JP) ........................................ 2000-158096

(51) Int. Cl.[7] .............................. H04N 1/00; H04N 1/04; H01B 17/06
(52) U.S. Cl. ........................ 358/471; 358/497; 358/474; 174/158 R; 174/161 R
(58) Field of Search ................................ 358/497, 494, 358/482, 483, 471, 400, 475, 509, 487, 506, 500, 505, 474; 174/161 R, 158 R, 138 R, 69, 114 R; 250/234–236, 208.1; 382/312, 318, 319; 399/211; 362/217, 226, 391, 387

(56) References Cited
U.S. PATENT DOCUMENTS
5,038,028 A * 8/1991 Boyd et al. .............. 250/208.1

5,991,570 A  11/1999 Haga et al. .................. 399/114

FOREIGN PATENT DOCUMENTS
JP           02-242529       9/1990
JP           02-588605       12/1996

OTHER PUBLICATIONS
U.S. Appl. No. 09/864,252, filed May 25, 2001, pending.
U.S. Appl. No. 10/050,945, filed Jan. 22, 2002, pending, 6649743.
U.S. Appl. No. 10/072,998, filed Feb. 12, 2002, pending, M. Nguyen.
U.S. Appl. No. 10/102,967, filed Mar. 22, 2002, pending, 6690901.
U.S. Appl. No. 10/155,090, filed May 28, 2002, pending, 6697600.
U.S. Appl. No. 10/299,718, filed Nov. 20, 2002, pending.
U.S. Appl. No. 10/303,866, filed Nov. 26, 2002, pending.

* cited by examiner

Primary Examiner—Cheukfan Lee
(74) Attorney, Agent, or Firm—Oblon, Spivak, McClelland, Maier & Neustadt, P.C.

(57) ABSTRACT

A power supply cable has a simple structure with a reduced manufacturing cost. An electric wire for supplying an electric power is held on an elongated, flexible holding sheet having an engaging part, which attaches the electric wire to the holding sheet. The holding sheet is elastically deformable so as to allow a movement of one end of the power supply cable relative to the other end thereof.

10 Claims, 3 Drawing Sheets

POWER SUPPLY CABLE HAVING A SIMPLE STRUCTURE AND AN IMAGE READING APPARATUS USING SUCH A POWER SUPPLY CABLE

BACKGROUND OF THE INVENTION

1. Field of the Invention

The present invention generally relates to a power supply cable and, more particularly, to a power supply cable for supplying electric power to a light source carried by a movable object used in an image reading apparatus such as, for example, a copying machine or a facsimile machine which is provided with a scanner having a light source attached to a movable carriage.

2. Description of the Related Art

Conventionally, a flexible power supply cable is used so as to supply electric power to a load such as a light source carried by a movable carriage, which together constitute a scanner provided in an image reading apparatus such as a copying machine or a facsimile machine.

One of the conventional flexible power supply cables is a flexible printed circuit board (hereinafter referred to as FPC). The FPC comprises a flexible insulating sheet and conductive wire patterns printed on the flexible insulating sheet. A protective sheet is applied on the conductive wire patterns so that the conductive wire patterns are interposed between the flexible insulating sheet and the protective sheet.

Such an FPC is not directly connectable with a power supply terminal of a light source or a power supply terminal of an apparatus. Accordingly, a printed board is attached to each end of the FPC so as to connect electric wires to the FPC. More specifically, an end of each conductive wire pattern of the FPC is soldered to the printed board, and the electric wire is also soldered to the printed board so that the conductive wire pattern is connected to one end of the corresponding electric wire. Then, the other end of the electric wire is connected to the power supply terminal of the light source or the apparatus.

Alternatively, an electric connector is attached to the printed board by soldering, and another electric connector is soldered to an end of the electric wire so that the electric connector of the electric wire is connectable to the electric connector of the printed board for electrical connection.

Further, Japanese Patent Publication No. 2588605 discloses anther conventional power supply cable in which each end of the FPC is connected to the electric wire by an exclusive relay connector.

The above-mentioned conventional power supply cables are used by being connected to a power supply terminal of a light source at its one end and to a power supply terminal of the apparatus at its opposite end. Since the FPC is flexible and bendable, a movement of the end of the FPC connected to the light source is permitted. Accordingly, electric power can be supplied from the power supply terminal of the apparatus to the power supply terminal of the light source via the FPC. In order to allow the light source to move a long distance, the FPC is connected in a bent state like a U-shape. A protective member is applied to the surface of the FPC on the outer side of the U-shape.

The above-mentioned structures using the FPC as a power supply cable has a problem in that a manufacturing cost is high since the cost of the FPC itself is expensive and the number of parts constituting the power supply cable is large. The manufacturing cost is further increased since the structure of the power supply cable is complex and the number of manufacturing processes is large. Further, a large labor may be needed for repair at the time of failure since the number of manufacturing processes is high.

SUMMARY OF THE INVENTION

It is a general object of the present invention to provide an improved and useful power supply cable in which the above-mentioned problems are eliminated.

A more specific object of the present invention is to provide a power supply cable having a simple structure with a reduced manufacturing cost.

In order to achieve the above-mentioned objects, there is provided according to one aspect of the present invention a power supply cable comprising: at least one electric wire having a single line conductive material and an insulating material covering the conductive material; and an elongated holding member holding the electric wire, the holding member being elastically deformable in accordance with a relative movement of opposite ends of the electric wire.

According to the above-mentioned invention, an inexpensive electric wire can be used for the power supply cable, and the electric wire can be directly connected to a power supply terminal by an inexpensive connecting means such as soldering. If desired, a connector for connecting with a power supply terminal may be merely provided on an end of the power supply cable. Accordingly, the structure of the power supply cable according to the present invention is simple, resulting in reduction in the number of parts and the manufacturing cost of the power supply cable.

In the power supply cable according to the present invention, the holding member may comprise: a plate part formed of a flexible sheet material; and at least one engaging part attaching the electric wire to the plate part. Accordingly, the electric wire is held on the plate part by the engaging part in an elastically deformable manner. The engaging part may be integrally formed with the plate part, which provides a simple structure of the power supply cable.

Additionally, the holding member may further comprise a mounting part configured to be fixed in the vicinity of a terminal to which an end of the electric wire is connected. Accordingly, the power supply can be easily mounted at a desired position by fastening means such as screws. The mounting part may be integrally formed with the plate part, which provides a simple structure of the power supply cable.

Additionally, the power supply cable according to the present invention may further comprise a flexible protective member attached to the holding member so as to cover the electric wire for protection.

Additionally, there is provided according to another aspect of the present invention an image reading apparatus comprising a movable light source and the above-mentioned power supply cable connected to the light source.

Other objects, features and advantages of the present invention will become more apparent from the following detailed description when read in conjunction with the accompanying drawings.

DETAILED DESCRIPTION OF THE PREFERRED EMBODIMENTS

Figure 1:
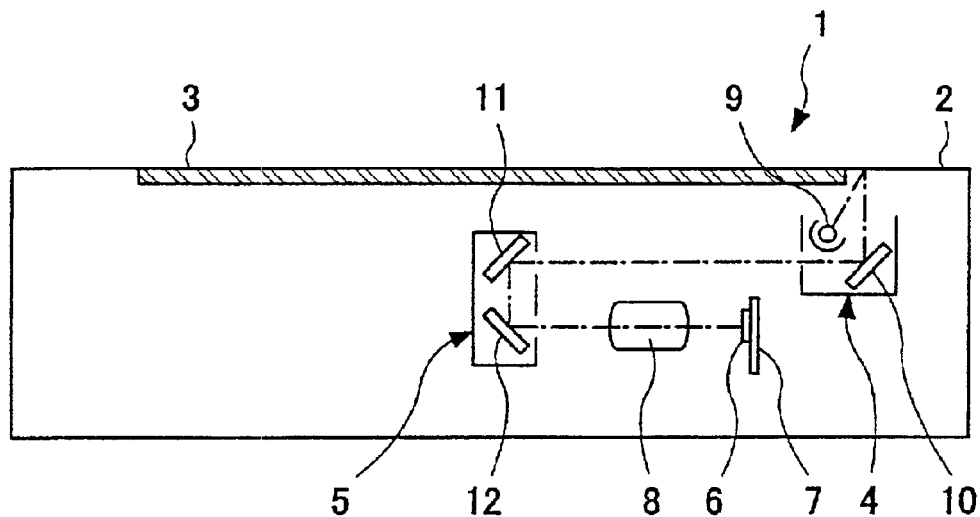
FIG. 1 is a cross-sectional view showing a rough structure of an image reading apparatus using a power supply cable according to the present invention.

A description will now be given a power supply cable according to a first embodiment of the present invention. FIG. 1 is a cross-sectional view of an image reading apparatus in which the power supply cable according to the first embodiment is used.

The image reading apparatus 1 is provided with a contact glass 3 on an upper surface of a box-like case. An original sheet having an image to be read is placed on the contact glass 3. A first moving member 4 and a second moving member 5 are provided in the case 2 in a freely movable state. A base board 7 having a charge coupled device (CCD) 6 and a lens 8 are arranged at predetermined positions in the case 2.

The first moving member 4 caries a light source 9 and a first mirror 10. The light source 9 faces the bottom surface of the contact glass 3. The first mirror 10 deflects a light, which is projected from the light source 9 and reflected by the original sheet placed on the contact glass 3.

The second moving member 5 caries a second mirror 11 and a third mirror 12. The second mirror 11 deflects the light reflected by the first mirror 10 by 90 degrees. The third mirror 12 further deflects the light deflected by the second mirror 11 by 90 degrees. Accordingly, the direction of the light deflected by the first mirror 10 is changed by 180 degrees by the second and third mirrors 11 and 12. The light deflected by the third mirror 12 is condensed by the lens 8, and is incident on the CCD 6, which is positioned at the focal position of the lens 8.

It should be noted that the first through third mirrors 10–12 and the lens 8 together form an optical system, which guides the light projected by the light source 9 to the CCD 6 serving as an image reading part.

A ratio of the moving speed of the first moving member 4 and the moving speed of the second moving member 5 is 2:1. Thereby, the optical path length from a light source 9 to the CCD 6 is maintained constant.

In the above-mentioned image reading apparatus 1, the light generated by the light source 9 is projected onto the original sheet placed on the contact glass 3. The light is reflected by the original sheet, and the reflected light is incident on the CCD 6 by being guided by the-optical system including the group of mirrors 10, 11 and 12. Thereby, an image on the original sheet is read by the CCD 6.

Figure 2:
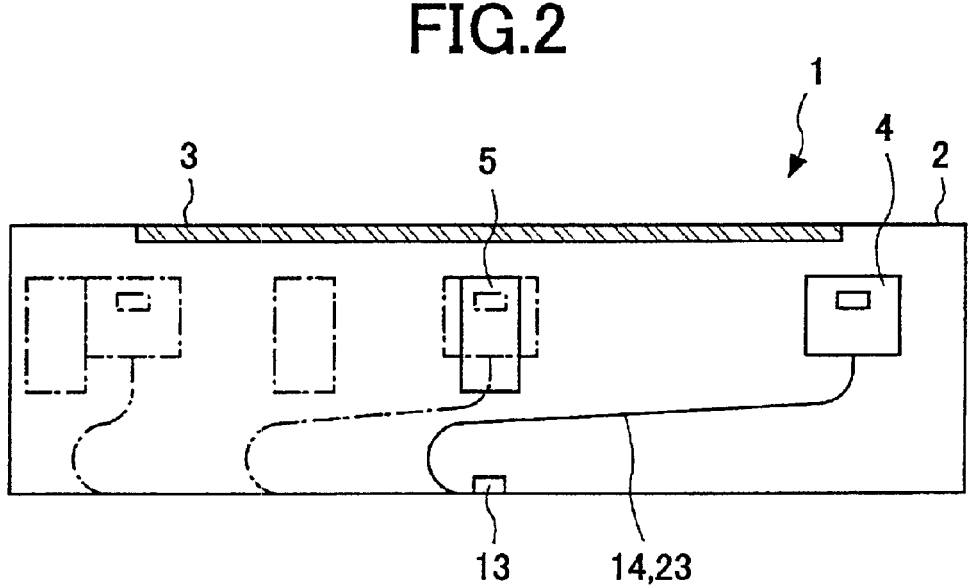
FIG. 2 is a cross-sectional view of the image reading apparatus for explaining motion of first and second moving objects and a power supply cable according to a first embodiment of the present invention.

In order to project the light onto the original sheet, an electric power must be provided to the light source 9 attached to the first moving member 4. Therefore, as shown in FIG. 2, the light source 9 is connected to a power supply terminal 13 by a power supply cable 14. The power supply terminal 13 is provided on a printed circuit board (not shown in the figure) of the image reading apparatus. Here, the light source 9 is a movable object.

A connector (not shown in the figure) is attached to an end of the power supply cable 14, and the connector is connected to the power supply terminal 13 of the image reading apparatus. The other end of the power supply cable 14 is connected to a power supply terminal (not shown in the figure) of the light source 9. Accordingly, the other end of the power supply cable 14 moves together with the first moving member 4. Therefore, the opposite ends of the power supply cable 14 move relative to each other. In order to allow the movement of the opposite ends of the power supply cable 14, the power supply cable 14 is provided with a flexible member which is elastically deformable when the opposite ends of the power supply cable 14 moves relative to each other.

Figure 3:
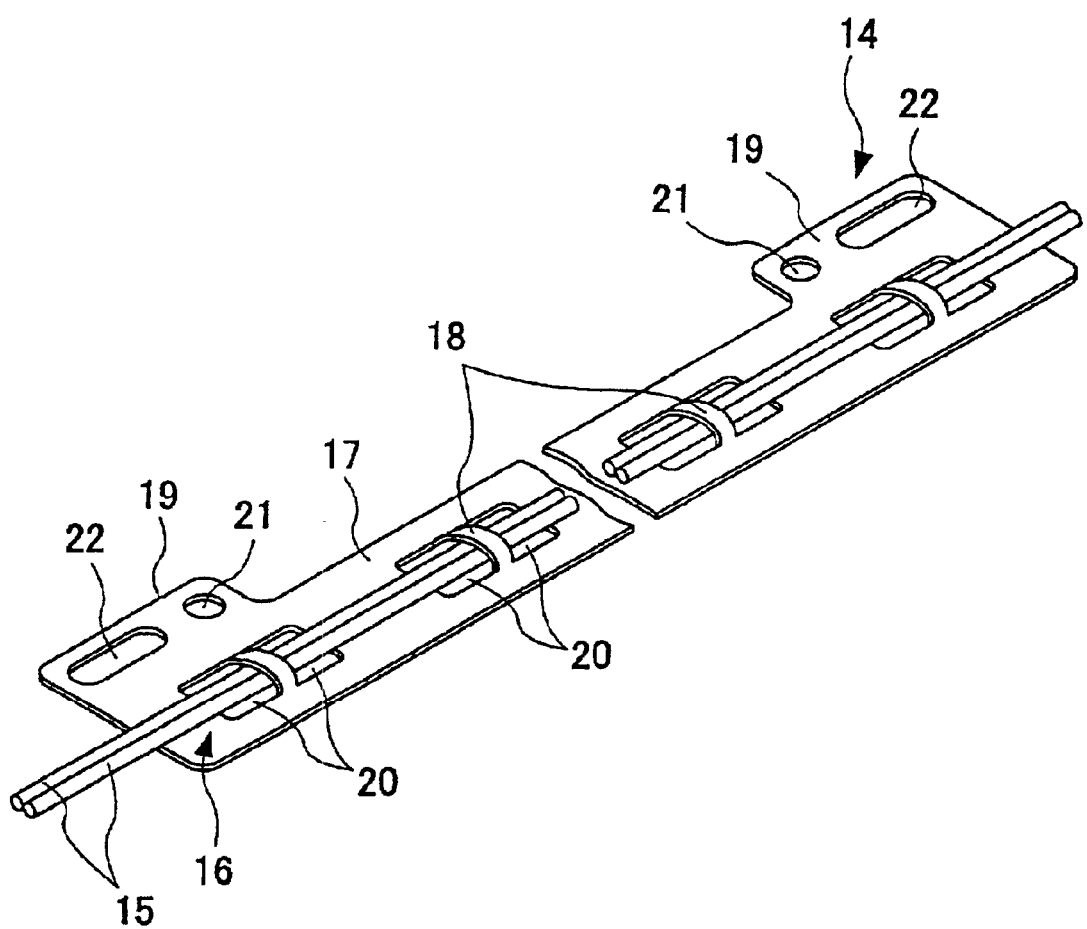
FIG. 3 is a perspective view of the power supply cable according to the first embodiment of the present invention.

FIG. 3 is a perspective view of the power supply cable 14. The power supply cable 14 comprises a plurality of electric wires 15 and a holding sheet 16, which holds the electric wires 15 thereon. Each of the electric wires 15 comprises a single line conductive material as a core wire and an insulating cover is provided on the conductive material. It should be noted that the number of electric wires 15 can be any desired number. Additionally, the single line conductive material may be formed of a single solid wire or a plurality of bundled or twisted thin wires.

The holding sheet 16 comprises a plate part 17, engaging parts 18 and tab parts 19 as mounting parts. The plate part 17 is an elongated and flat part having a great flexibility. The engaging parts 18 serve as holding means for holding the electric wires 15 on the plate part 17. The tab parts 19 serve as mounting parts, which mount the power supply cable 14 between the first moving member 4 and a predetermined position of a stationary member of the image reading apparatus.

In the present embodiment, the entire holding sheet 16 is flexible so as to be elastically deformable together with the conductive wires 15 according to the movement of the first moving member 4. It should be noted that at least the plate part 17 is required to be flexible, and the engaging parts 18 and the tab parts 19 are not always required to be flexible.

Each engaging part 18 is formed in the plate part 17 by forming two adjacent openings 20 arranged along the longitudinal direction of the plate part 17.

The tab parts 19 are formed on one side of the plate part 17 along the longitudinal direction of the plate part 17 in a state in which the tab parts 19 project from the side of the plate part 17. A reference hole 21 and an elongated adjust hole 22 are formed in each of the tab parts 19.

The tab part 19 on one end of the plate part 17 is fixed in the vicinity of the power supply terminal 13 by screws being inserted into the holes 21 and 22. Similarly, the tab part on the other end of the plate part 17 is fixed in the vicinity of the power supply terminal of the light source 9 by screws being inserted into the holes 21 and 22.

Figure 4:
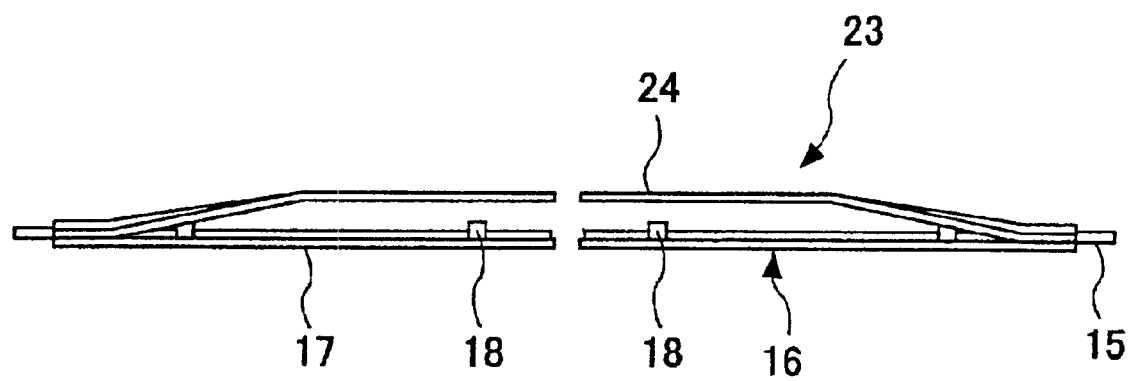
FIG. 4 is a front view of a power supply cable according to a second embodiment of the present invention.

A description will now be given, with reference to FIGS. 4 and 5, of a second embodiment of the present invention. FIG. 4 shows a power supply cable 23 according to a second embodiment of the present invention. The power supply cable 23 has a structure similar to the power supply cable 14 shown in FIG. 3 except for a protective sheet 24 being provided as a protective member, which covers a surface 16a on which the electric wires 15 are held. The protective sheet 24 is attached to the holding sheet 16 at parts corresponding to the tab parts 19 and parts along a side on which the tab parts 19 are not provided.

Figure 5:
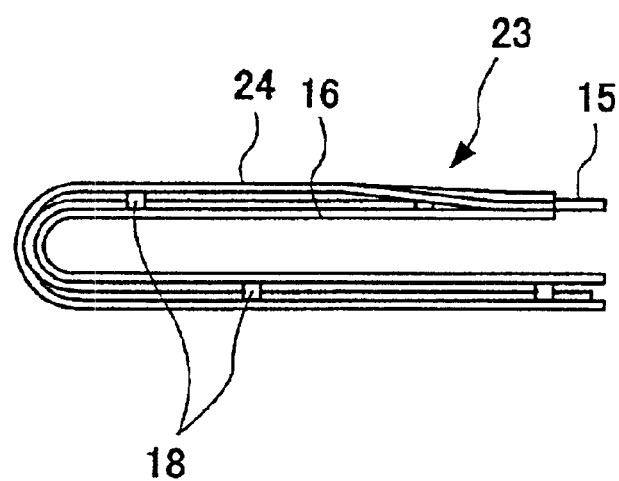
FIG. 5 is a front view of the power supply cable shown in FIG. 4 in a state in which the power supply cable is bent.

FIG. 5 shows a state in which the power supply cable 23 shown in FIG. 4 is bent. As shown in FIG. 5, the power supply cable 23 is bent in a state in which the holding sheet 16 faces outside. In the case of the power supply cable 14, the power supply cable 14 is bent so that the surface 16a of the holding sheet 16, which surface holds the electric wires 15, is positioned on the inner side.

In the above-mentioned structure, the power supply cable 14 or 23 connects the power supply terminal of the light source 9 carried by the first moving member 4 to the power supply terminal 13 so as to supply an electric power from the power supply terminal 13 to the light source 9.

A connector (not shown in the figure) is attached to an end of the power supply cable 14f or 23 so as to be connected to the power supply terminal 13. The other end of the power supply terminal 13 is directly connected to the power supply terminal of the light source 9. Accordingly, the power supply cable 14 or 23 deforms according to the movement of the first moving member 4 as shown in FIG. 2.

According to the above-mentioned embodiments, the inexpensive electric wires 15 are used for the power supply cable 14 or 23, and the electric wires 15 can be directly connected to the power source terminal of the light source 9. Additionally, the connector for connecting with the power supply terminal 13 is merely provided on an end of the power supply cable 14 or 23. Accordingly, the structure of the power supply cable according to the embodiments of the present invention is simple, resulting in reduction in the number of parts and the manufacturing cost of the power supply cable.

The present invention is not limited to the specifically disclosed embodiments, and variations and modifications may be made without departing from the scope of the present invention.

The present application is based on Japanese priority patent application No. 2000-158091 filed on May 29, 2001, the entire contents of which are hereby incorporated by reference.

What is claimed is:

1. An image reading apparatus reading an image formed on an original sheet, the image reading apparatus comprising:
   a contact glass having a first surface on which the original sheet is placed;
   a light source movable along a second surface of said contact grass opposite to said first surface, said light source projecting a light toward the original sheet placed on said first surface of said contact glass;
   an optical system guiding the light reflected by said original sheet;
   a reading part reading the image on said original sheet by receiving the light guided by said optical system;
   a power supply terminal supplying an electric power to each part; and
   a power supply cable comprising:
      at least one electric wire having a single line conductive material and an insulating material covering said conductive material; and
      an elongated holding member holding said electric wire, the holding member being elastically deformable in accordance with a relative movement of opposite ends of said electric wire, wherein said holding member comprises:
      a plate part formed of a flexible sheet material; and
      at least one engaging part attaching said electric wire to said plate part.

2. The image reading apparatus as claim 1, wherein said engaging part is integrally formed with said plate part.

3. The image reading apparatus as claim 1, wherein said holding member further comprises a mounting part configured to be fixed in the vicinity of a terminal to which an end of said electric wire is connected.

4. The image reading apparatus as claim 3, wherein said mounting part is integrally formed with said plate part.

5. The image reading apparatus as claimed in claim 1, further comprising a flexible protective member attached to said holding member so as to cover said electric wire.

6. A power supply cable comprising:
   at least one electric wire having a single line conductive material and an insulating material covering said conductive material; and
   an elongated holding member holding said electric wire, the holding member being elastically deformable in accordance with a relative movement of opposite ends of said electric wire, wherein said holding member comprises:
   a plate part formed of a flexible sheet material; and
   at least one engaging part attaching said electric wire to said plate part.

7. The power supply cable as claim 6, wherein said engaging part is integrally formed with said plate part.

8. The power supply cable as claim 6, wherein said holding member further comprises a mounting part configured to be fixed in the vicinity of a terminal to which an end of said electric wire is connected.

9. The power supply cable as claim 8, wherein said mounting part is integrally formed with said plate part.

10. The power supply cable as claimed in claim 6, further comprising a flexible protective member attached to said holding member so as to cover said electric wire.

* * * * *